(12) United States Patent
Scheurich et al.

(10) Patent No.: US 11,406,172 B2
(45) Date of Patent: Aug. 9, 2022

(54) TOOTHBRUSH HEADS COMPRISING A TWO-COMPONENT CLEANING ELEMENT AND METHOD FOR PRODUCING THE SAME

(71) Applicant: The Procter & Gamble Company, Cincinnati, OH (US)

(72) Inventors: Stefan Scheurich, Triefenstein (DE); Uwe Tretrop, Frankfurt am Main (DE); Ulrich Stoerkel, Bad Nauheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 157 days.

(21) Appl. No.: 15/634,813

(22) Filed: Jun. 27, 2017

(65) Prior Publication Data
US 2018/0000236 A1     Jan. 4, 2018

(30) Foreign Application Priority Data

Jun. 27, 2016 (EP) .................................... 16176317
May 10, 2017 (EP) .................................... 17170343

(51) Int. Cl.
*A46B 3/00*     (2006.01)
*A46D 1/00*     (2006.01)
(Continued)

(52) U.S. Cl.
CPC ................ *A46B 3/005* (2013.01); *A46B 3/04* (2013.01); *A46B 3/22* (2013.01); *A46B 5/0095* (2013.01);
(Continued)

(58) Field of Classification Search
CPC .. A46B 3/005; A46B 3/20; A46B 3/04; A46B 3/22; A46B 9/04; A46B 9/06; B29C 45/14065; A46D 1/006; A46D 1/0207
(Continued)

(56) References Cited

U.S. PATENT DOCUMENTS 2,923,598 A * 2/1960 Reis, Jr. .................... D01F 6/70
                                                             264/203
3,076,218 A * 2/1963 Cook ...................... A61Q 11/00
                                                        15/207.2
(Continued)

FOREIGN PATENT DOCUMENTS

DE           941364        4/1956
DE         10217527      11/2003
(Continued)

OTHER PUBLICATIONS

International Search Report with Written opinion, dated Aug. 18, 2017, 11 pages.
(Continued)

*Primary Examiner* — Joel D Crandall
(74) *Attorney, Agent, or Firm* — Vladimir Vitenberg (57) ABSTRACT

A toothbrush head, including at least one two-component cleaning element and at least one bristle tuft element, is produced by injection molding. To achieve high design flexibility regarding the arrangement of the two-component cleaning elements and regarding the material choice, the two-component cleaning elements are manufactured separately or in an upstream molding step. Then the two-component cleaning elements, together with the bristle tufts, are over-molded with plastic material, to form the brush head or a part thereof.

14 Claims, 5 Drawing Sheets

(51) Int. Cl.
  *A46B 9/06* (2006.01)
  *A46B 3/22* (2006.01)
  *A46D 3/00* (2006.01)
  *A46B 3/04* (2006.01)
  *A46B 5/00* (2006.01)
  *A46B 9/04* (2006.01)
  *A61C 17/22* (2006.01)
  *B29C 45/14* (2006.01)
  *B29K 23/00* (2006.01)
  *B29K 677/00* (2006.01)
  *B29L 31/42* (2006.01)

(52) U.S. Cl.
  CPC .............. *A46B 9/04* (2013.01); *A46B 9/06* (2013.01); *A46D 1/023* (2013.01); *A46D 3/005* (2013.01); *A61C 17/222* (2013.01); *B29C 45/14065* (2013.01); *B29C 45/14385* (2013.01); *B29K 2023/12* (2013.01); *B29K 2677/00* (2013.01); *B29L 2031/425* (2013.01)

(58) Field of Classification Search
  USPC ............................................. 300/21
  See application file for complete search history.

(56) References Cited

U.S. PATENT DOCUMENTS

| | | | |
|---|---|---|---|
| 4,697,851 A | 10/1987 | Takahashi | |
| 5,033,797 A | 7/1991 | Rueb | |
| 6,036,277 A * | 3/2000 | Weihrauch | A46B 3/20 15/186 |
| 6,726,789 B1 | 4/2004 | Weihrauch | |
| 6,779,851 B2 | 8/2004 | Bouchiere | |
| 6,862,771 B1 | 3/2005 | Muller | |
| 6,865,767 B1 | 3/2005 | Gavney, Jr. | |
| 7,174,596 B2 | 2/2007 | Fischer et al. | |
| 7,434,288 B2 | 10/2008 | Gavney, Jr. | |
| 7,644,466 B2 * | 1/2010 | Weihrauch | A46B 15/001 15/207.2 |
| 7,814,604 B2 | 10/2010 | Gavney, Jr. | |
| 7,861,356 B2 | 1/2011 | Kunath et al. | |
| 8,132,284 B1 * | 3/2012 | Kraemer | A46B 3/20 15/167.1 |
| 8,677,545 B2 | 3/2014 | Vitt et al. | |
| 9,144,299 B2 | 9/2015 | Fritsch et al. | |
| 9,398,802 B2 | 7/2016 | Moskovich et al. | |
| 9,402,461 B2 | 8/2016 | Brik | |
| 9,635,928 B2 | 5/2017 | Morgott | |
| 9,636,898 B2 | 5/2017 | Ganninger | |
| 9,750,334 B2 | 9/2017 | Kirchhofer et al. | |
| 2001/0023516 A1 | 9/2001 | Driesen et al. | |
| 2002/0152570 A1 | 10/2002 | Hohibein | |
| 2003/0159224 A1 | 8/2003 | Fritsch et al. | |
| 2004/0117934 A1 | 6/2004 | Pfenniger | |
| 2005/0015904 A1 | 1/2005 | Gavney | |
| 2005/0060826 A1 | 3/2005 | Gavney | |
| 2005/0155172 A1 | 7/2005 | Gavney Jr. | |
| 2005/0160546 A1 * | 7/2005 | Weihrauch | A46D 1/00 15/207.2 |
| 2005/0193512 A1 | 9/2005 | Fischer et al. | |
| 2006/0080795 A1 | 4/2006 | Pfenniger et al. | |
| 2006/0129171 A1 | 6/2006 | Moskovich | |
| 2006/0230563 A1 | 10/2006 | Gavney Jr. | |
| 2007/0094824 A1 | 5/2007 | Pfenniger et al. | |
| 2007/0256263 A1 | 11/2007 | Kunath et al. | |
| 2009/0193604 A1 | 8/2009 | Pfenniger et al. | |
| 2011/0000041 A1 * | 1/2011 | Vitt | A46B 9/12 15/167.1 |
| 2011/0010881 A1 | 1/2011 | Pfenniger et al. | |
| 2011/0030158 A1 | 2/2011 | Gavney, Jr. | |
| 2011/0258797 A1 | 10/2011 | Pfenniger et al. | |
| 2011/0304194 A1 | 12/2011 | Uchida et al. | |
| 2012/0091784 A1 | 4/2012 | Sakurai et al. | |
| 2012/0246857 A1 * | 10/2012 | Kato | A46D 1/0238 15/167.1 |
| 2012/0317737 A1 | 12/2012 | Birk et al. | |
| 2012/0317738 A1 | 12/2012 | Birk | |
| 2013/0019425 A1 | 1/2013 | Bresselschmidt | |
| 2013/0139338 A1 | 6/2013 | Hess et al. | |
| 2013/0180069 A1 | 7/2013 | Pfenniger et al. | |
| 2013/0241267 A1 | 9/2013 | Kumpf | |
| 2013/0291320 A1 * | 11/2013 | Kirchhofer | A46B 15/0075 15/22.1 |
| 2013/0326834 A1 | 12/2013 | Vankov et al. | |
| 2014/0075696 A1 | 3/2014 | Pfenniger et al. | |
| 2014/0123423 A1 | 5/2014 | Morgott | |
| 2014/0232173 A1 | 8/2014 | Birk | |
| 2014/0359956 A1 | 12/2014 | Jungnickel et al. | |
| 2014/0359957 A1 | 12/2014 | Jungnickel | |
| 2015/0097309 A1 | 4/2015 | Newman et al. | |
| 2015/0150369 A1 | 6/2015 | Bresselschmidt | |
| 2015/0238004 A1 | 8/2015 | Brik | |
| 2015/0257525 A1 * | 9/2015 | Kang | D01F 8/12 15/167.1 |
| 2016/0088925 A1 | 3/2016 | Pfenniger et al. | |
| 2017/0020278 A1 | 1/2017 | Xi et al. | |
| 2017/0215567 A1 | 8/2017 | Waguespack | |
| 2017/0318947 A1 | 11/2017 | Kirchhofer et al. | |
| 2017/0367474 A1 | 12/2017 | Machlitt et al. | |
| 2018/0289140 A1 | 10/2018 | Dengler | |
| 2020/0397130 A1 | 12/2020 | Ganninger et al. | |
| 2020/0397134 A1 | 12/2020 | Ganninger et al. | |
| 2020/0397135 A1 | 12/2020 | Ganninger et al. | |
| 2020/0397136 A1 | 12/2020 | Ganninger et al. | |
| 2020/0397137 A1 | 12/2020 | Ganninger et al. | |

FOREIGN PATENT DOCUMENTS

| | | | | |
|---|---|---|---|---|
| DE | 102009039514 | | 3/2011 | |
| DE | 102012021311 A1 * | 4/2014 | ........... B29C 45/561 |
| EP | 1864588 A2 | 12/2007 | |
| EP | 2810581 A1 | 12/2014 | |
| WO | WO2005115196 | 12/2005 | |
| WO | WO2007051099 | 5/2007 | |
| WO | WO2010025820 | 3/2010 | |
| WO | WO2011070549 | 6/2011 | |
| WO | 2015183272 A1 | 12/2015 | |
| WO | 2019011599 A1 | 1/2019 | |

OTHER PUBLICATIONS

All Office Actions, U.S. Appl. No. 16/898,313.
All Office Actions, U.S. Appl. No. 16/898,344.
All Office Actions, U.S. Appl. No. 16/898,359.
All Office Actions, U.S. Appl. No. 16/898,372.
All Office Actions, U.S. Appl. No. 16/898,382.
All Office Actions, U.S. Appl. No. 15/634,950.
Extended European Search Report and Search Opinion; Application Ser. No. 16176317.2; dated Sep. 7, 2016; 11 pages.
Extended European Search Report and Search Opinion; Application Ser. No. 17170343.2; dated Aug. 31, 2017; 12 pages.
CM04491MQ-WO PCT Search Report and Written Opinion for PCT/US2017/038413 dated Aug. 25, 2017, 15 pages.

* cited by examiner

TOOTHBRUSH HEADS COMPRISING A TWO-COMPONENT CLEANING ELEMENT AND METHOD FOR PRODUCING THE SAME

FIELD OF THE INVENTION

A toothbrush head for a manual toothbrush or for a replacement brush for an electric toothbrush is disclosed. The toothbrush head comprises at least one two-component cleaning element ("2K cleaning element") and one or more bristle tuft cleaning element(s), namely bristle tuft(s). The 2K cleaning element and the bristle tuft(s) are embedded into the brush head by over-molding in such that a physical connection using at least one undercut is achieved.

There is further disclosed a method for producing said brush head or a part thereof comprising at least one two-component cleaning element and one or more bristle tuft(s) using over-molding techniques. Using said method toothbrush heads or parts thereof can be produced which comprise 2K cleaning elements and bristle tuft cleaning elements in high design flexibility. Due to the method shown less requirements regarding the arrangement of the 2K cleaning elements and the materials used for the 2K cleaning elements have to be met. The 2K cleaning elements are manufactured separate from the main process producing the brush heads or in an upstream production step. In the main process the 2K cleaning elements together with the bristle tuft(s) are over-molded with the plastic material forming the brush head or a part thereof. Thereby a physical connection between the 2K cleaning element and the brush head to be formed is built.

BACKGROUND OF THE INVENTION

Several manufacturing techniques are known to produce brushes, in particular toothbrushes. A key issue is how to fasten the cleaning elements in the brush head. Conventionally, brush heads were produced by injection molding providing a plurality of blind ended tuft holes wherein the bristle tufts were fastened in a U-shape form by metal anchors. Anchor-free or hot-tufting methods fasten the cleaning elements in the brush head by means of a forming technique. Usually, the bristle tufts are melted at their ends to form thickenings to increase the pull-out resistance of the tufts. These thickenings can be over-molded with a plastic material to form a brush head or a part thereof.

Nowadays, cleaning element fields of brush heads, in particular toothbrush heads comprise also non-bristle cleaning elements, e.g. elastomeric cleaning elements. Usually, elastomeric cleaning elements are formed by injection molding techniques and might be mounted to the brush head using stapling, clipping or any other snap and fit connection (US2011/0000041A1, WO 2003/055351 A1). Alternatively, elastomeric cleaning elements are directly formed at the toothbrush, for example, a brush head can be over-molded with an elastomeric material forming a tongue cleaner on the backside of the brush head and elastomeric cleaning elements on the front side, i.e. the brushing side of the brush head (e.g. WO 2011/070549 A1). However, due to adhesion and geometric requirements the design flexibility for said kind of cleaning element fields is relatively low. Elastomeric cleaning elements have to be made from the same material as the tongue cleaner or other elastomeric elements on the brush. Further, the elastomeric elements are arranged at the outer surface of the cleaning element field due to the geometric restriction during the over-molding process. In addition, elastomeric cleaning elements are limited by the materials used. The properties of the cleaning element are defined by the molding requirements and the requirements of the additional parts made of the same material. Further, elastomeric cleaning elements mounted with over-molding methods usually show identical properties and are difficult to handle. In particular, downstream over-molding techniques may influence elastomeric cleaning elements negatively.

Thus, there is still a need for a method of manufacturing anchor-free toothbrushes comprising elastomeric cleaning elements, wherein the elastomeric cleaning elements are embedded into the brush head and are securely fastened therein. The method shall allow great design flexibility regarding the arrangement of the elastomeric cleaning elements, the properties of the elastomeric elements and the materials which can be used as well as easy process handling.

SUMMARY OF THE INVENTION

According to one aspect there is provided a method for producing a brush head, in particular a toothbrush head, or a part thereof comprising the steps of providing a cleaning element carrier comprising cavities, wherein the cleaning element carrier represents a first half of a mold;

providing at least one 2K cleaning element, wherein the 2K cleaning element comprises a first component and a second component, wherein the second component comprise at least one undercut;

inserting the at least one 2K cleaning element and one or more bristle tuft(s) into the cleaning element carrier, wherein a first component of the at least one 2K cleaning element and a first part of the one or more bristle tuft(s) are covered by the cleaning element carrier;

forming a mold cavity by combining the cleaning element carrier with at least a second mold half, wherein a second component of the at least one 2K cleaning element including the at least one undercut and a second part of the one or more bristle tuft(s) are located inside the mold cavity;

injecting plastic material into the mold cavity, wherein the second component of the at least one 2K cleaning element including the at least one undercut and the second part of the one or more bristle tuft(s) are over-molded by the injected plastic material and wherein the brush head or the part thereof is formed thereby, and wherein the 2K cleaning element is mounted physically into the brush head by the at least one undercut.

According to another aspect there is provided a brush head, in particular a toothbrush head, or a part thereof by performing the method as disclosed herein.

According to another aspect there is provided a manual toothbrush or a part of a replacement brush head for an electric toothbrush comprising a brush head providing at least one 2K cleaning element and one or more bristle tuft(s), wherein the at least one 2K cleaning element and the one or more bristle tuft(s) are embedded into the plastic material of the brush head by over-molding, wherein the 2K cleaning element is physically integrated into the brush head or the part thereof by the at least one undercut. Further, the plastic material of the brush head is different to the materials of the at least one 2K cleaning element and the one or more bristle tuft(s), and the brush head is formed during the over-molding process at least partially.

DETAILED DESCRIPTION OF THE INVENTION

The following is a description of numerous embodiments of a method for producing toothbrushes having two-component cleaning elements ("2K cleaning elements") and the toothbrushes produced thereby. The description is to be construed as exemplary only and does not describe every possible embodiment since describing every possible embodiment would be impractical, if not impossible, and it will be understood that any feature, characteristic, structure, component, step or methodology described herein can be deleted, combined with or substituted for, in whole or in part, any other feature, characteristic, structure, component, product step or methodology described herein.

As used herein, "cm" means centimeter; "mm" means millimeter; "μm" or "microns" mean micrometer; "mil" means a thousandth of an inch. As used herein, the word "about" means +/−10 percent.

As used herein, the word "comprise" and its variants, are intended to be non-limiting, such that recitation of items in a list is not to the exclusion of other like items that may also be useful in the materials, devices, and methods of this invention. This term encompasses the terms "consisting of" and "consisting essentially of."

As used herein, the word "include," and its variants, are intended to be non-limiting, such that recitation of items in a list is not to the exclusion of other like items that may also be useful in the materials, devices, and methods of this invention.

As used herein, the words "preferred", "preferably" and variants, such as "in particular" and "particularly" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and it is not intended to exclude other embodiments from the scope of the invention.

The brush head and the method for the production thereof as disclosed herein allow design flexibility, for example, in the positioning of the 2K cleaning elements and the choice of the form and material of the 2K cleaning elements. In addition, the two different components provide different properties to the 2K cleaning element. In addition, the 2K cleaning element is securely mounted to the brush head by using at least one undercut and thereby forming a physical connection.

There is provided a method for producing such a brush head, in particular such a toothbrush head or a part thereof, wherein 2K cleaning elements are provided together with bristle tuft(s) and are over-molded with the material used to form the brush head or a part thereof. Thereby a physical connection is built between the 2K cleaning element and the brush head. The toothbrush may be for example a manual toothbrush or a replacement brush for an electrical toothbrush comprising a brush head as disclosed herein providing one or more cleaning element(s), a handle and a neck connecting the brush head and the handle to each other, wherein the one or more cleaning element(s) comprise at least one 2K cleaning element and one or more bristle tuft(s). The method disclosed herein allows high design flexibility and makes handling of non-bristle-tuft-cleaning elements easier. In particular, handling of soft-elastomeric cleaning elements is usually challenging due to the fact that the soft elements are difficult to grip and could be strongly influenced by electrostatic forces. In these cases, a second component, e.g. suitable as "handling" component may solve these problems. By the methods disclosed herein bristle tuft cleaning elements and 2K cleaning elements are handled in a similar manner thereby making toothbrush manufacturing more efficient. Additionally or alternatively, the present method may also ease handling of advanced filament types, such as super-thin filaments which are tapered chemically in anchor-free manufacturing techniques. These filaments might be combined with a second component thus allowing the processing in already available production lines.

The term "2K cleaning element" as understood herein means a cleaning element which comprises at least two different components. "Two different components" as understood herein means that the 2K cleaning element comprises at least two different geometric forms made of two different materials, in particular two different plastic materials. The 2K cleaning element may comprise for example two different geometric forms made of two different hard plastic materials, made of two different soft plastic materials, or made of one hard plastic material and one soft plastic material. In particular, the 2K cleaning element may comprise of one component made of a hard plastic material and one component made of a thermoplastic elastomer (TPE), or one component made of a hard or soft plastic material and one component comprising an indicator element, or one component made of a hard or soft plastic material and one component comprising a chemical releasing element, or one component made of a hard or soft plastic material and one component being a bundle of bristles, in particular one component made of a hard or soft plastic material and one component being a bundle of super-thin tapered bristles, or a combination thereof. The different combinations provide different properties to the 2K cleaning element. For example, a harder component may shield a softer component of the 2K cleaning element during downstream manufacturing techniques. Additionally or alternatively, a harder component may increase mechanical resistance of a softer component without increasing abrasiveness of the softer component. Additionally or alternatively, the second component may allow handling of the first component in toothbrush manufacturing lines. In addition, one of the components of the 2K cleaning element in particular the second component comprises at least one undercut so that the 2K cleaning element is connected physically to the tooth brush head during the molding process.

The Shore D hardness of the "hard plastic" material as understood herein may be in the range from about 30 to about 90, in particular in the range from about 40 to about 80, more particular in the range from about 50 to about 80, even more particular in the range from about 65 to about 75. Suitable materials which may be used as hard plastic material may be for example polypropylene (PP), polyethylene (PE), polyoxymethylene (POM), polyethyleneterephthalate (PET), a polyamide (PA), or a blend or a mixture comprising polypropylene, polyethylene, polyoxymethylene, polyethyleneterephthalate or a polyamide. The element formed from the hard plastic material may have any geometric form, for example a nub, a pin, a fin, a wall, a bar, a gutter, a curve, a circle, a lamella or a combination thereof. In particular, the element formed from the hard plastic material will be the second component and thus preferably comprises at least one undercut.

The Shore A hardness of the "soft plastic" material as understood herein may be in the range from about 10 to about 80, in particular in the range from about 20 to about 70, more particular in the range from about 30 to about 60, even more particular from about 30 to about 40. The Shore A hardness of the soft plastic material depends on the geometry used for the 2K cleaning element. Thinner geometric elements may be produced from a material having a greater Shore A hardness compared to thicker elements. The choice of the soft plastic material also depends on the length of the element formed. In principle, longer geometric elements may be manufactured from a soft plastic material having a greater Shore A hardness compared to shorter elements. Suitable materials which may be used as soft plastic material may be for example rubber, thermoplastic elastomer (TPE), polyethylene (PE), polypropylene (PP), Polyoxymethylene (POM) or a blend or a mixture thereof. Materials which show elastomeric properties, such as TPE, are preferably used as soft plastic materials herein. The soft plastic material may have any geometric form, for example, a nub, a pin, a fin, a wall, a bar, a gutter, a curve, a circle, a lamella, a textured element, a polishing element such as, for example, a polishing cup, or a tongue cleaning element or a combination thereof.

In addition, the 2K cleaning element is understood as comprising at least two different components. That means the 2K cleaning element may further comprise a third and a fourth component. The third and/or fourth component may be geometrically different components made of a material already used for the first and second component of the 2K cleaning element or the third and/or fourth component may be made of different materials than the first and second component of the 2K cleaning element. To provide different properties for each component, all components of the at least one 2K cleaning element preferably comprises different plastic materials.

An "indicator element" as understood herein is any element which is amended over time and/or use thereby indicating the status of the toothbrush. For example, an indicator element may change or wear off its color over time and/or use. Suitable indicator elements are for example extruded filaments or TPE elements. An indicator element can be combined with hard plastic material or soft plastic material to form the 2K cleaning element.

A "chemical releasing element" as understood herein is any element which releases chemical substances during use, in contact with water and/or saliva and/or after mechanical influence by the bristle filaments during brushing. Suitable chemical releasing elements are for example pads or reservoirs which are filled with or comprise chemical actives. Suitable chemical actives which might be released may be for example, anti-sensitivity chemicals, pain-relief chemicals, wound-healing chemicals, anti-inflammation chemicals, flavoring components, anti-tartar chemicals, whitening chemicals, anti-bacterial, anti-erosion chemicals or a mixture thereof. A chemical releasing element can be combined with hard plastic material or soft plastic material to form the 2K cleaning element.

The toothbrush as disclosed herein comprises in addition to the 2K cleaning element one or more bristle tuft(s). "Bristle tuft" as used herein shall be understood as any type, form or arrangement comprising individual bristle filaments. Bristle filaments may comprise natural materials, plastics or plastic mixtures. A plastic which can be used to form bristle filaments is for example a polyamide (PA), a polybutylterephthalate (PBT), a polyethylterephthalate (PET), or mixtures thereof. More than one bristle filaments are grouped to form a bristle tuft. The bristle tuft may comprise a thickening at one tuft end, wherein the thickening can be formed by melting the bristle ends. The tuft end opposite to the thickening is the end to be intended to clean the teeth. The ends of the bristles intended to clean may be cut into a special profile, may be tapered, may be end-rounded and may be polished to provide a safe and comfortable bristle tuft, which does not hurt the soft tissue in the mouth. The bristle tuft(s) may be embedded into the brush head. Thereby the plastic material of the brush head flows around the thickening at the tuft end thereby fastening the bristle tuft(s) into the brush head securely.

In addition, a bristle tuft may also represent one component of the 2K cleaning element. If the 2K cleaning element comprises a bristle tuft, the bristle tuft is permanently combined with a geometric element formed from hard plastic material or soft plastic material to form the 2K cleaning element. If bristle tufts are included in the 2K cleaning element mixed tufts are formed. "Mixed tuft" as used herein shall be understood as any type, form or arrangement of cleaning elements comprising elastomeric cleaning element(s) and bristle (tuft) filaments. Thereby, the bristle filaments may be arranged around and/or inside an elastomeric cleaning element. An example for an arrangement around an elastomeric element may be an elastomeric nub, an elastomeric pin, an elastomeric fin, an elastomeric wall, an elastomeric bar, an elastomeric gutter, an elastomeric curve, an elastomeric circle, an elastomeric lamella, an elastomeric textured element or an elastomeric polishing element which outline is surrounded by a corresponding outline made by bristle filaments or bristle tufts. The outline of the elastomeric cleaning element may be surrounded completely or partially by the bristle filament(s) or bristle tuft(s). An example for an arrangement inside of an elastomeric element may be an elastomeric cup or other open structure, wherein in the cavity of the cup bristle filament(s) or bristle tuft(s) are arranged. Additionally or alternatively, the mixed tuft(s) may comprise both, bristle filaments or bristle tufts being arranged inside of the elastomeric cleaning element and bristle filaments or bristle tufts being arranged at the outline of the elastomeric cleaning element.

As disclosed herein the brush head(s) of the manual toothbrush or the replacement brush head are formed at least partially during over-molding of the 2K cleaning element and the bristle tuft(s) with plastic material. Preferably, the plastic material which is used for over-molding of the cleaning elements and forming the brush head is different to the plastic materials of the 2K cleaning element and the bristle tuft(s). However, the material of the brush head may also comprise material used in the 2K cleaning element or the bristle tuft(s), if this seems to be appropriate.

Additionally or alternatively, the brush head may further comprise an insert, wherein the insert is embedded into the brush head by over-molding together with the at least one 2K cleaning element and the one or more bristle tuft(s). If an additional insert is integrated into the brush head said insert and the at least one 2K cleaning element and the one or more bristle tuft(s) are located at opposite sides of the brush head. Inserts which might be suitable to be used are for example a drive part, a coupling element connectable to a driving shaft or a drive part, a part of a bearing, a bearing or a bearing shaft, a carrier spindle or a security anchor or a combination thereof. That means an additional insert is preferably integrated into the brush head, if the brush head is part of a replacement brush for an electric toothbrush. A suitable insert comprises a metal or a metal alloy or a rigid plastic material. In addition, a suitable insert may also comprise a metal or metal alloy part which is embedded in a rigid plastic material. The rigid plastic material shall provide rigidity and/or stiffness. Further, its surface has to be formed precisely, if the insert represents a part of a bearing or a coupling element. Suitable materials which can be used as rigid material shall show a higher Shore hardness than the Shore hardness of the plastic material used for forming the brush head by over-molding. Additionally or alternatively, the material used for the insert may also have a higher melting point, rigidity, strength, abrasion resistance and/or heat resistance and/or can be injected with a higher pressure than the plastic used for the brush head. Additionally or alternatively, the plastic of the insert may also have a lower viscosity in molten state or a lower melt flow index than the plastic of the brush head. A suitable rigid material which can be used for forming an insert is polyoxymethylene (POM). In particular, polyoxymethylene is suitable to form parts of bearings showing a high rigidity and a precise surface. Additionally or alternatively, the plastic used to form the brush head should be a material which does not enter into the cleaning element carrier during the molding procedure. Suitable materials which can be used for over-molding and forming the brush head can be for example, polypropylene, polyethylene or polyethylene terephthalate.

In addition, there is provided a method for producing a brush head for a toothbrush as disclosed herein. The method comprises the step of providing a cleaning element carrier comprising cavities which are blind-holes. Said cavities are suitable to hold one component of a 2K cleaning element or one end of one or more bristle tuft(s) so that a 2K cleaning element or a bristle tuft which is located in the cleaning element carrier are partially located inside said carrier and partially located outside said carrier, wherein the at least one undercut of the 2K cleaning element is located outside said carrier. The cleaning element carrier represents a half of a mold and can be combined with at least one second mold half to a mold comprising a mold cavity. The mold cavity formed thereby is the mold cavity for a brush head as disclosed herein. As the surface of the cleaning element carrier represents a part of the molding cavity for the brush head, the surface of the carrier is the negative of the surface of the brush head to be formed. The cavities of cleaning element carrier are grouped to cover the cavities needed to produce one brush head. In addition, the cleaning element carrier may provide more than one group of cavities, so that more than one brush head can be formed with one cleaning element carrier.

The method further comprises the step of providing at least one 2K cleaning element. The step of providing the 2K cleaning element may comprise forming the 2K cleaning element from two different materials. For example, the 2K cleaning element may be formed by injection molding of a first material into a first mold and over-molding of the geometric form made from the first material with a second material in order to form the second component of the 2K cleaning element. Alternatively, an indicator element, such as an indicator filament, a chemical releasing element, such as a pad, an elastomeric cleaning element, or a plurality of bristles may represent the first component of the 2K cleaning element which may be over-molded with a plastic material forming the second component. The molds which are used to form the 2K cleaning element may comprise the cleaning element carrier. Thus, the step of providing the at least one 2K cleaning element may optionally comprise inserting a first component into the cleaning element carrier and over-molding the first component with the material of the second component in order to form the 2K cleaning element. For such an initial over-molding a second mold half is used which forms a molding cavity corresponding to the second component of the 2K cleaning element including at least one undercut.

According to the next step of the method as disclosed herein the first component of the 2K cleaning element and one end of one or more bristle tuft(s) are inserted into the cavities of the cleaning element carrier, so that the 2K cleaning element and the bristle tufts are partially located inside and partially located outside said carrier. The bristle tufts may be provided into the cavities of the cleaning element carrier before the 2K cleaning element or after. If the 2K cleaning element is formed by injection molding into the cavities of the cleaning element carrier, the cavities intended to provide bristle tufts have to be covered against the plastic materials forming the 2K cleaning element and the bristle tufts are preferably inserted after the 2K cleaning element. If the 2K cleaning element is provided outside the carrier, the bristle tufts may be inserted first into the carrier. Inserting of the bristle tufts first would allow to insert the bristle tuft unfused as individual bristle filaments into the cavities of the carrier and fusing the bristle filaments to bristle tufts when they are located in the carrier. The cleaning element carrier may provide the bristle tuft(s) and the 2K cleaning element in such that the ends to be embedded into the brush head or the part thereof protrude from the cavities of the cleaning element carrier and the ends intended to clean are covered by the cleaning element carrier. The distance from the surface of the cleaning element carrier to the ends to be embedded by over-molding is adjusted big enough to fasten the bristle tuft(s) and the 2K cleaning element securely into the brush head. In particular, the 2K cleaning element is positioned in the cleaning element carrier in such that the at least one undercut of the second component is positioned outside the cleaning element carrier so that it will be embedded by over-molding into the brush head to be formed thereby connecting the 2K cleaning element and the brush head physically.

After the cleaning elements are all placed in the carrier a mold cavity is formed comprising the cleaning element carrier as the first mold half and at least one second mold half. Then a plastic material which shall form the brush head or the part thereof is injected into the mold cavity. Thereby the one or more bristle tuft(s) and the second component of the at least one 2K cleaning element are over-molded with the plastic material. Thereby a multi-component plastic part is formed. The materials of the 2K cleaning element, the bristle tufts and the brush head may form a chemical connection of the components. In addition, at least for the 2K cleaning element at least one undercut is used to physically tighten the connection. For example the molten material of the brush head may flow around the tuft ends of the bristle tufts forming small balls or plates or any geometric protrusion of the 2K cleaning element may be embedded into the molten brush head.

If the 2K cleaning element is injected directly into the cleaning element carrier, the plastic materials may be injected from the same site of the molding device. In particular, the nozzles for injecting the different plastic material may be arranged at an identical position of the molding device in order to reduce the dimensions of the molding tool.

The bristle tuft(s) may be inserted into the cleaning element carrier as a fused tuft or as a plurality of filaments. For combining the filament ends the latter may be subjected to heat in order to molten the filaments partially. Thereby a round thickening is formed. Then, the molten ends may be subjected to any kind of plunger to form a flat and even structure. Melting and flattening may be performed in one step using a heated plunger. Thus, the method may comprise an additional step of heating the ends of bristle filaments to form a thickening and flattening the thickening by pressing a flattening tool, for example a plunger, against the thickening. Thereby, a gap between the thickening and the cleaning element carrier has to be remained so that the material of the brush head may flow around the thickenings during injection molding. If the thickening comes in direct contact with the surface of the cleaning element carrier the surface of the cleaning element carrier may be moved away from the thickening in order to re-establish the gap needed for embedding the thickenings securely into the brush head.

Additionally or alternatively, the method for producing a brush head, in particular a toothbrush head or a part thereof may further comprise the step of providing an insert to the mold cavity. Said insert may be arranged in such that a part of the insert is located inside the mold cavity and another part is located outside the molding cavity. Thus, the part located inside the molding cavity will be over-molded with the material of the brush head thereby embedding the insert into the brush head. The step of integrating an insert into the brush head may be in particular interesting, if the insert is drive part, a coupling element connectable to a driving shaft or a drive part, a part of a bearing, a bearing or a bearing shaft, a carrier spindle or a security anchor or a combination thereof. These kinds of insert may be used to couple the brush head to a replacement brush for an electric toothbrush and to the electric power unit.

Brush heads, in particular toothbrush heads or parts thereof, as well as toothbrushes produced by the method as disclosed herein can be used for manufacturing any kind of manual or replacement brushes for electric toothbrushes. The method as disclosed herein can also be used for sealing or packaging or may be used in composites and many other multi-component industrial injection molding appliances.

In the following, a detailed description of several example embodiments will be given. It is noted that all features described in the present disclosure, whether they are disclosed in the previous description of more general embodiments or in the following description of example embodiments, even though they may be described in the context of a particular embodiment, are of course meant to be disclosed as individual features that can be combined with all other disclosed features as long as this would not contradict the gist and scope of the present disclosure. In particular, all features disclosed for either one of the method of producing the brush head or the brush head itself may also be applied to the other one, if applicable.

Figure 1A:
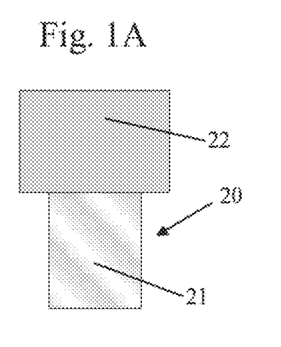
FIGS. 1A-1I show schematic views of a 2K cleaning elements 20.
Figure 1B:
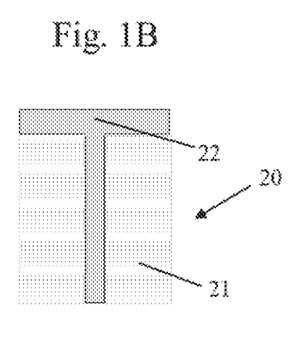
Figure 1C:
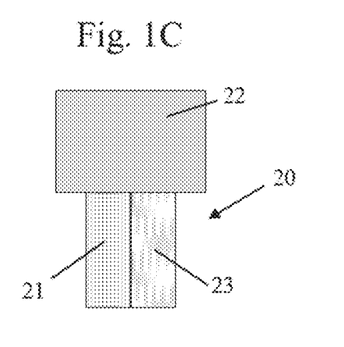
Figure 1D:
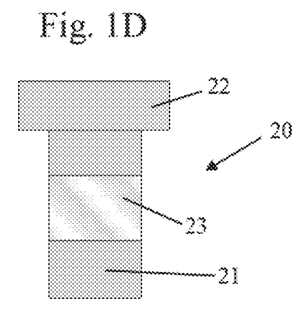
Figure 1E:
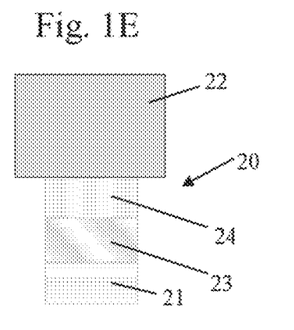
Figure 1F:
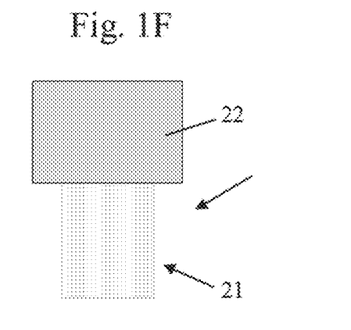
Figure 1G:
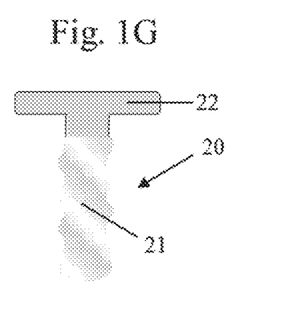
Figure 1H:
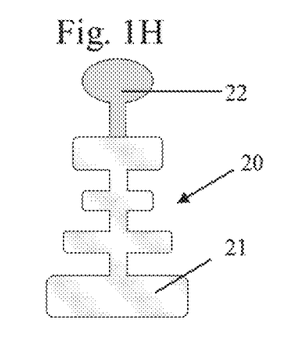

FIGS. 1A, 1B, 1G and 1H show example embodiments of a 2K cleaning elements 20 comprising a first component 21 and a second component 22. The geometric dimensions and proportions of the 2K cleaning element 20 as well as the first component 21 and the second component 22 are not limited and may be chosen based on the special requirements to be met. For example the first component 21 may be an elastomeric cleaning element, for example in form of a pin or fin or bar. The elastomeric cleaning element may be straight and may comprise a homogeneous form (FIG. 1A) or it may be irregularly shaped (FIGS. 1G and 1H). For example, the elastomeric cleaning element may comprise protrusions and/or depression which may be arranged regularly or irregularly at the elastomeric cleaning element. Regularly arranged depressions and/or protrusions may result in a crinkly or undulated form (FIG. 1G) and irregularly arranged depressions and/or protrusions may form irregular shapes (FIG. 1H). A suitable material to form the elastomeric cleaning element 21 may be for example thermoplastic elastomer (TPE). The second component 22 may be for example connected to the elastomeric cleaning element 21 at the end of the elastomeric cleaning element 21 which is not intended to clean. The dimensions of a suitable second component 22 may be for example larger than the elastomeric cleaning element 21 and may be used as undercut to securely integrate the 2K cleaning element into the brush head 10 and to shield the first, elastomeric component 21 against heat in downstream production steps. A suitable material for a second component 22 may be for example polypropylene (PP). Alternatively, the second component 22 may be used as a skeleton, in particular as a T-skeleton and the first elastomeric component 21 may be arranged around said T-skeleton 22 (FIG. 1B).

FIGS. 1C and 1D show example embodiments of 3K-cleaning elements 20 comprising a first component 21, a second component 22 and a third component 23. The geometric dimensions and proportions of the 3K-cleaning element 20 as well as the first component 21, the second component 22 and the third component 23 are not limited and may be chosen based on the special requirements to be met. The element shown in FIG. 1C comprises first and third component 21, 23 arranged parallel to each other. In the element shown in FIG. 1D the first component 21 is interrupted by the third component 23. For example, 2K or 3K cleaning elements are made out of TPE and/or PP and/or PE and/or POM.

FIG. 1E shows an example embodiment of a 4K-cleaning element 20 comprising a first component 21, a second component 22, a third component 23 and a fourth component 24. The geometric dimensions and proportions of the 4K-cleaning element 20 as well as the first component 21, the second component 22, the third component 23 and the fourth component 24 are not limited and may be chosen based on the special requirements to be met. For example, 2K cleaning elements, 3K cleaning elements, or 4K cleaning elements are made out of TPE and/or PP and/or PE and/or POM.

FIG. 1F shows an example embodiment of a 2K cleaning element 20 comprising as first component 21 super-thin bristle filaments and a second component 22. The geometric dimensions and proportions of the 2K cleaning element 20 are not limited and may be chosen based on the special requirements to be met. The super-thin bristle filaments are made from polyamide and are chemically tapered at the end intended for cleaning. Suitable super-thin filaments may have a thickness between 4 mil and 8 mil and the cleaning end is tapered to less than 2 mil due to the chemical treatment. The second component 22 may be made from polypropylene, wherein the non-cleaning end of the super-thin filaments is embedded into the polypropylene by over-molding in order to form the 2K cleaning element. Super-thin filaments are preferably used to achieve a floss-like effect during normal brushing.

Figure 1I:
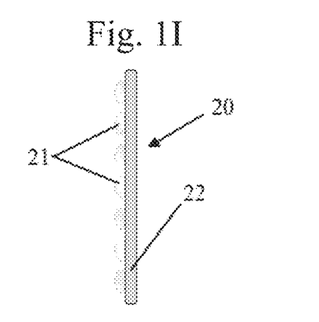

FIG. 1I shows another example embodiment of a 2K cleaning element 20 comprising a plurality of chemical releasing elements as first component 21 and a carrier as second component 22. The carrier may be for example a foil, in particular a polyethylene foil to which the chemical releasing elements 21 are mounted. The chemical releasing elements 21 shown in FIG. 1I are pads which are filled with one or more oral care chemical actives which are delivered on contact with water and/or saliva or after mechanical influence by the bristle filaments during brushing. Suitable oral care actives comprised in the pads 21 may be e.g. anti-sensitivity chemicals, pain-relief chemicals, wound-healing chemicals, anti-inflammation chemicals, anti-tartar chemicals, whitening chemicals, anti-bacterials, anti-erosion chemicals or a mixture thereof. The pads may be for example made from cellulose.

Figure 2:
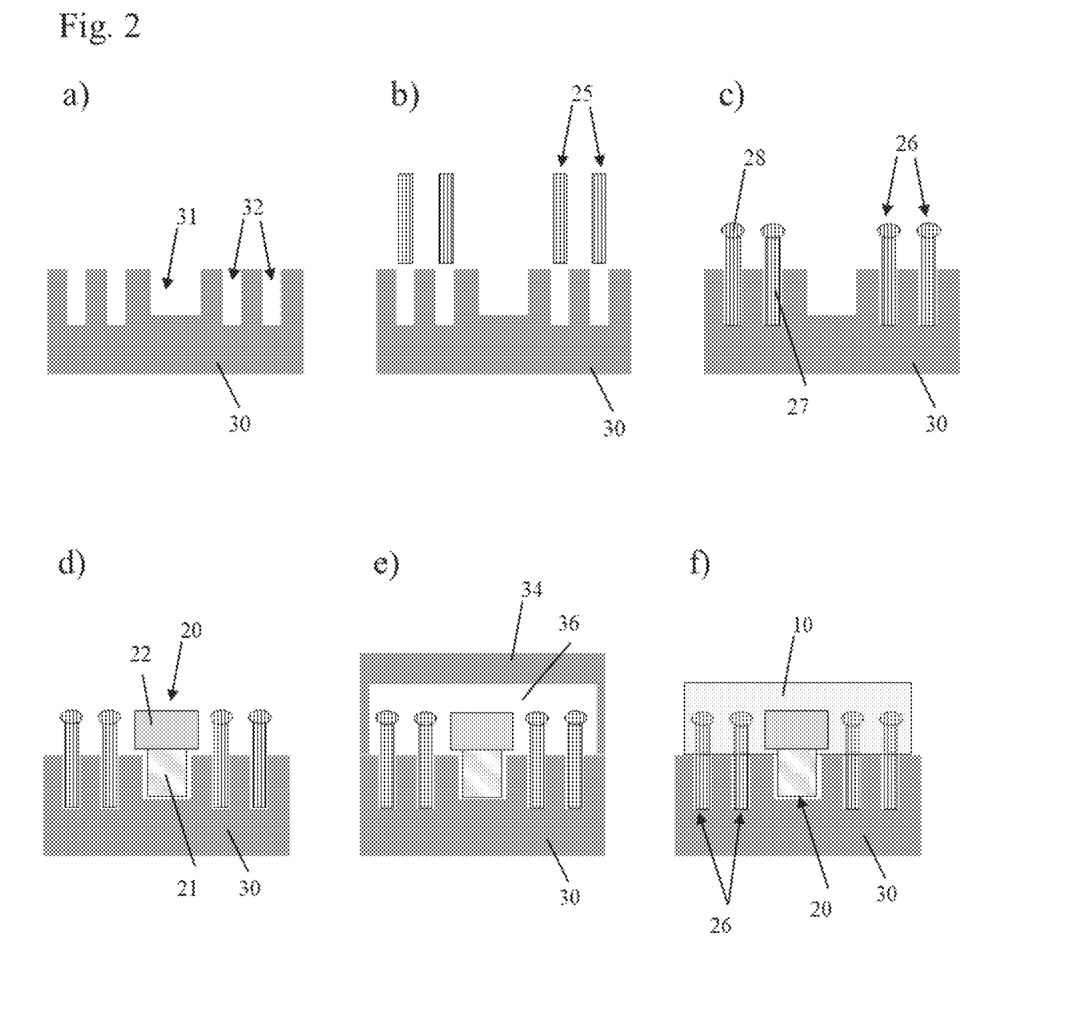
FIGS. 2A-2F show schematic views of a method as disclosed herein to form a brush head, wherein the 2K cleaning element is inserted into a cleaning element carrier after the bristle tufts.

FIG. 2 show an example embodiment of a method as disclosed herein to form a brush head 10 wherein the 2K cleaning element 20 is inserted into the cleaning element carrier 30 after the bristle tufts 26. The different steps are shown individually in FIGS. 2A-2F. Features that are in common with FIG. 1 are designated with the same reference numerals.

Figure 3:
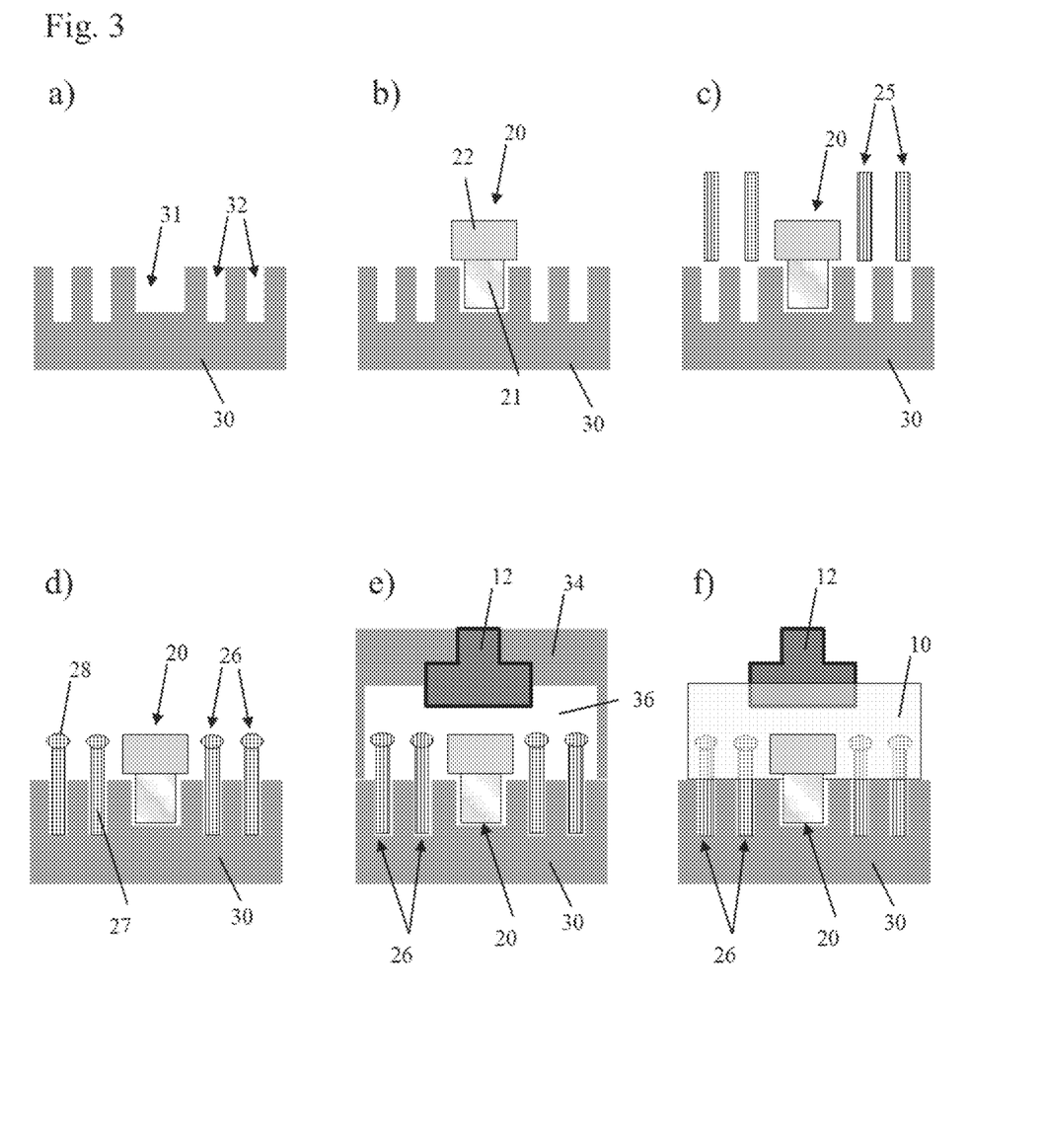
FIGS. 3A-3F show schematic views of a method as disclosed herein to form a brush head, wherein the 2K cleaning element is inserted into a cleaning element carrier before the bristle tufts and an additional insert is provided for over-molding.

FIG. 2A shows the cleaning element carrier 30 comprising a plurality of cavities 31, 32 which are blind-holes and are suitable to hold bristle tufts 26 or a 2K cleaning element 20. The cleaning element carrier 30 as used herein comprise at least one cavity 31 for a 2K cleaning element 20 and several cavities 32 for bristle tufts 26. In addition, cleaning element carrier may be used which comprise more than one cavities 31 for 2K cleaning elements 20. As the cleaning element carrier 30 is used as a first mold half it is made from a heat resting material, e.g. stainless steel. As is shown in FIGS. 2 and 3, the cavities 31, comprising blind-holes, have bottom surfaces inside the first mold half, and are structured and configured to receive and support at least one two-component cleaning element 20 and at least one bristle tuft 26 therein. When the two-component cleaning elements 20 and the bristle tufts 26 have been inserted into the blind cavities 31, 32, the bottom surfaces thereof are in contact with free ends of the two-component cleaning elements 20 and the bristle tufts 26.

FIG. 2B shows bristle filaments 25 which are inserted into the cavities 32 of the cleaning element carrier 30. The dimension of each cavity 32 corresponds to the dimension of the bristle tuft 26 which shall be formed therein. Therefore, a plurality of individual bristle filaments 25 is inserted into the cavities 32, wherein the number of filaments 25 corresponds to the size of the bristle tuft 26 to be formed.

FIG. 2C shows bristle tufts 26 located in the cavities 32 of the cleaning element carrier 30. A first part 27 of the bristle tufts 26 is located inside the carrier 30. The first part 27 comprises the bristle ends which are intended for cleaning in the resulting brush head 10. A second part 28 of the bristle tufts 26 extends from the cavities 32. For the second part 28 the filament ends were fused and combined to a fuse ball. The dimension of the fuse ball is larger than the dimension of the bristle tuft 26 in order to form an undercut and mount the bristle tuft 26 securely into the brush head 10.

FIG. 2D shows the 2K cleaning element located in the cavity 31 of the cleaning element carrier 30. A first component 21 of the 2K cleaning element 20 is located inside the carrier 30. The first component 21 comprises the end of the 2K cleaning element 20 which is intended for cleaning in the resulting brush head 10. A second component 22 of the 2K cleaning element 20 extends from the cavity 31. The dimension of the second component 22 of the 2K cleaning element 20 is larger than the dimension of the first component in order to form an undercut and mount the 2K cleaning element 20 securely into the brush head 10 and to shield the first component against influence from downstream process steps. The first component 21 of the 2K cleaning element 20 may be located completely into the cavity 31 or it may extend from the cavity 31. If the first component 21 of the 2K cleaning element 20 extends from the cavity 31 an undercut will be formed during formation of the brush head 10. If the first component 21 of the 2K cleaning element 20 is located completely in the cavity 31 the second component 22 comprises a protrusion in order to form an undercut during formation of the brush head 10.

FIG. 2E shows the formation of the mold cavity 36. After the 2K cleaning element 20 and the bristle tufts 26 are arranged in the carrier 30 a second mold half 34 is added thereby forming the mold cavity 36. The first component 21 of the 2K cleaning element 20 and the part of the bristle tufts 26 which are located inside the carrier 30 will be shielded against the molten material which is entered into the mold cavity 36 in order to form the brush head 10. The second component 22 of the 2K cleaning element 20 and the part of the bristle tufts 26 which are located inside the molding cavity 36 will be over-molted with the molten material which is entered into the mold cavity 36 in order to form the brush head 10 and to physically connect the 2K cleaning element 20 and the bristle tufts 26 with the brush head 10.

FIG. 2F shows the final brush head 10 which is still located into the cleaning element carrier 30. The second component 22 of the 2K cleaning element 20 and the second parts 28 of the bristle tufts 26 are integrated into the brush head 10 physically. The dimension of the brush head 10 corresponds to the dimension of the molding cavity 36 shown in FIG. 2E.

FIG. 3 show another example embodiment of a method as disclosed herein to form a brush head 10 wherein the 2K cleaning element 20 is inserted into the cleaning element carrier 30 before the bristle tufts 26. In addition, an optional insert 12 is also integrated in the brush head 10 to be formed. The different steps are shown individually in FIGS. 3A-3F. Features that are in common with FIGS. 2A-2F are designated with the same reference numerals and are not described in detail again. All variants and feature which are described in FIGS. 2A-2F are also applicable to FIG. 3, if not described otherwise.

FIG. 3A shows the cleaning element carrier 30 which is made from stainless steel. The carrier 30 comprises a plurality of different cavities 31, 32 suitable to hold bristle tufts 26 or a 2K cleaning element 20.

FIG. 3B shows the 2K cleaning element located in the cavity 31 of the cleaning element carrier 30. A first component 21 which represents the cleaning part of the 2K cleaning element 20 is located inside the carrier 30 and a second component 22 of the 2K cleaning element 20 extends from the cavity 31.

FIG. 3C shows bristle filaments 25 which are inserted into the cavities 32 of the cleaning element carrier 30. The number of individual bristle filaments 25 corresponds to the size of the bristle tuft 26 to be formed. The 2K cleaning element 20 is not influenced thereby and stays in its cavity 31.

FIG. 3D shows the bristle tufts 26 and the 2K cleaning element 20 located in the cavities 32, 31 of the cleaning element carrier 30. The first component 21 of the 2K cleaning element 20 and the first part of 27 bristle tufts 26 are located inside the cavities 31, 32 of the carrier 30 and the second component 22 and the parts 28 extends therefrom. The second parts 28 of the bristle tufts 26 were fused and combined to a fuse ball.

FIG. 3E shows the formation of the mold cavity 36. The insert 12 which is shown in FIGS. 3E and 3F is an optional feature. If present, the insert 12 is provided in such that the insert 12 is located with a distance to the cleaning element carrier 30. Than a second mold half 34 is added thereby forming the mold cavity 36. The insert 12 is located partly in the mold cavity 36 and partly inside the second mold half 34. Thereby the part of the insert 12 which is located inside the mold half 34 will be shielded against the molten material which is entered into the mold cavity 36 in order to form the brush head 10. In addition, the parts of the 2K cleaning element 20 and the bristle tufts 26 which are located inside the carrier 30 will be shielded against the molten material which is entered into the mold cavity 36 in order to form the brush head 10, too. The parts of the 2K cleaning element 20, the bristle tufts 26 and the insert 12 which are located inside the molding cavity 36 will be over-molted with the molten material which is entered into the mold cavity 36 in order to form the brush head 10.

FIG. 3F shows the final brush head 10 which is still located into the cleaning element carrier 30. The second component 22 of the 2K cleaning element 20, the second parts 28 of the bristle tufts 26 as well as a part of the insert 12 are integrated into the brush head 10 physically. The dimension of the brush head 10 corresponds to the dimension of the molding cavity 36 shown in FIG. 3E.

If an insert 12 is present, it may be provided to the mold cavity 36 at any reasonable method step. For example, if the method is performed as shown in FIG. 3 the insert may also be provided in parallel and together with the 2K cleaning element (not shown). Alternatively, the insert 12 may also be provided by the second mold half 34 (not shown). The 2K cleaning element may also be added into the cleaning element carrier 30 after the carrier 30 has been transferred into the molding tool (not shown).

Figure 4A:
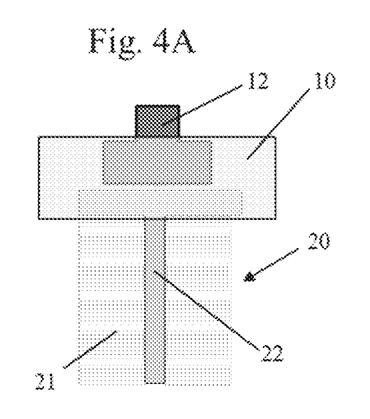
FIGS. 4A-4C show schematic longitudinal cross-sectional representations of exemplary embodiments of a part of a toothbrush head comprising different 2K cleaning elements.
Figure 4B:
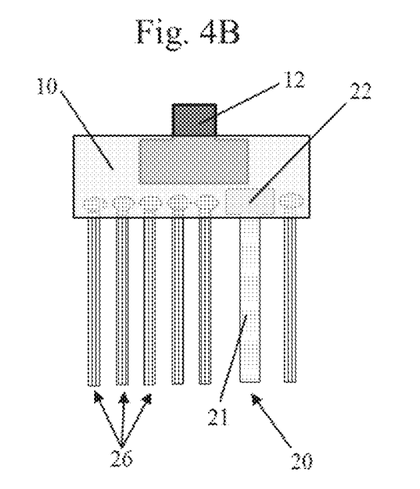
Figure 4C:
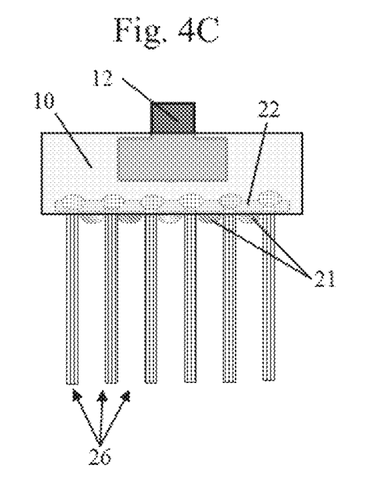

FIGS. 4A, 4B and 4C show three example embodiments of parts of a toothbrush head which can be produced as disclosed herein. Features that are in common with FIGS. 1 to 3 are designated with the same reference numerals and are not described in detail again. The parts of toothbrush heads 10 shown in FIGS. 4A, 4B and 4C are parts of an electric toothbrush replacement head, wherein the insert 12 is connectable to a gearing. FIG. 4A shows a longitudinal cross-sectional representation of a part of an example toothbrush head 10 comprising only a 2K cleaning element. The 2K cleaning element comprises a T-skeleton 22 made from PP which is embedded into elastomeric material 21. One side of the horizontal part of T extends over the elastomeric material 21 in order to form an undercut in the resulting brush head 10. The brush head part shown in FIG. 4A might be suitable for polishing of teeth. FIG. 4B shows a longitudinal cross-sectional representation of a part of an example toothbrush head 10 having several types of cleaning elements comprising one 2K cleaning element 20 in combination with bristle tufts 26. The brush head part shown in FIG. 4B might be suitable for daily mouth hygiene. FIG. 4C shows a longitudinal cross-sectional representation of a part of an example toothbrush head 10 comprising bristle tufts 26 as cleaning elements. In addition, a foil comprising several pads is included into the brush head as 2K cleaning element 20. The pads comprise oral care actives such as anti-bacterials, anti-sensitivity or anti-erosion compounds which are delivered by contact of the pad with saliva. The brush head 10 shown in FIG. 4C might be suitable for daily mouth hygiene and delivers additional benefits by the actives comprised in the pads of the 2K cleaning element 20.

Figure 5:
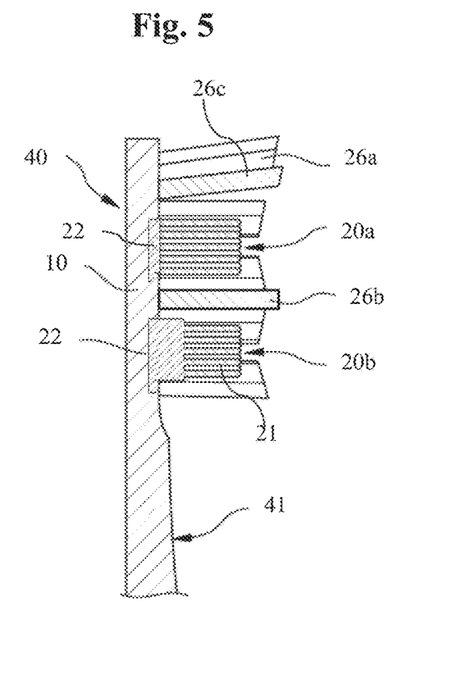
FIG. 5 shows a schematic longitudinal cross-sectional representation of a brush head of a manual example toothbrush having two 2K cleaning elements and several bristle tufts.

FIG. 5 shows a toothbrush head 10 together with its neck 41 which is connectable with any toothbrush handle to form a manual toothbrush 40. However, the brush head 10 shown in FIG. 5 may be also connected to electrically powered toothbrush handles. Each of the features of the toothbrush heads 10 shown in FIG. 5 can be designed in reduced form or in a different combination than those represented. Features that are in common with FIGS. 1 to 4 are designated with the same reference numerals and are not described in detail again. FIG. 5 shows a longitudinal cross-sectional representation of a an example toothbrush head 10 having several types of cleaning elements comprising two 2K cleaning elements 20a, 20b in combination with bristle tufts 26a, 26b, 26c. The cleaning elements 20, 26 may protrude rectangular (20a, 20b, 26a, 26b) from the brush head 10 or may be inclined 26c with respect to the surface of the brush head 10 in any direction. The bristle tuft cleaning elements 26 may show different tuft geometries, e.g. round, rectangular, elongated rectangular, half-circles or combinations thereof. The bristles in the bristle tufts 26 are made, for example, from polyamid. The 2K cleaning elements 20a, 20b are each made from two different plastic materials by injection molding. In addition, the 2K cleaning elements 20a, 20b may be made form different material combinations. The first component 21 of the 2K cleaning element 20b may be a thermoplastic elastomer having a Shore A hardness in the range of about 40 to about 50. The second component 22 may be a thermoplastic elastomer having a Shore A hardness in the range of about 20 to about 80 or about 40 to about 60. The first component 21 of the 2K cleaning element 20a may be a thermoplastic elastomer having a Shore A hardness in the range of about 40 to about 50. The second component 22 may be made of polypropylene. The second component 22 of the 2K cleaning element 20a is completely over-molded by the brush head 10, whereas the second component 22 of the 2K cleaning element 20b protrudes partially from the brush head 10. A second component 22 completely included into the brush head 10 mainly holds the 2K cleaning element 20 in the brush head 10. A second component 22 partly protruding from the brush head 10 influences also the properties of the first component 21. The brush head 10 is formed by injection molding thereby over-molding the bristles tufts 26a, 26b, 26c and the second components 22 including the protrusions forming the undercuts of the 2K cleaning elements 20a, 20b. The plastic material of the brush head 10 may be a polypropylene having a Shore D hardness in the range of about 55 to about 65.

Figure 6:
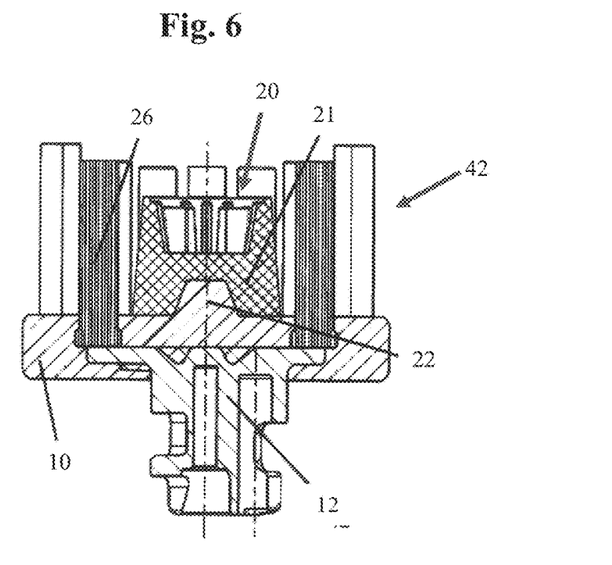
FIG. 6 shows a schematic longitudinal cross-sectional representation of a part of a replacement toothbrush head to be connected to an electrically powered handle, wherein the brush head 10 shown comprises one 2K cleaning element and several bristle tufts.

FIG. 6 shows a toothbrush head 10, in particular a section thereof that is connectable with a gearing of and electrically powered toothbrush. Each of the features shown in FIG. 6 can be designed in reduced form or in a different combination than those represented. Features that are in common with FIGS. 1 to 5 are designated with the same reference numerals and are not described in detail again. FIG. 6 shows a longitudinal cross-sectional representation of a part of an example replacement brush head 42 which is intended to be coupled to an electrically powered toothbrush handle having several types of cleaning elements comprising a 2K cleaning element 20 in combination with bristle tufts 26. In addition, an insert 12 is embedded into the brush head 10. The cleaning elements 20, 26 may protrude rectangular from the brush head 10 or may be inclined with respect to the surface of the brush head 10 in any direction. The bristle tuft cleaning elements 26 may show different tuft geometries, e.g. round, rectangular, elongated rectangular, half-circles or combinations thereof. The bristles in the bristle tufts 26 are made, for example, from polyamid and are anchored into the brush head 10 by over-molding including the formation of undercuts. The 2K cleaning element 20 comprises two different plastic materials by injection molding. The first component 21 of the 2K cleaning element 20 may be a thermoplastic elastomer having a Shore A hardness in the range of about 40 to about 50. The second component 22 may be made form polypropylene. The second component 22 is mostly embedded into the brush head 10, in particular embedded in such that undercuts are formed thereby anchoring the 2K cleaning element securely into the brush head. The part of the second component 22 which protrudes from the brush head 10 surface influences e.g. the elastomeric properties of the first component 21. The first component 21 is formed as a cup structure which may have separating plates which divide the inside space of the cup into two or more subspaces. The separating plates may be also partial plates. The elastomeric cup structure may be optimized for polishing of teeth and may carry the toothpaste and/or polishing paste. The bristle tufts 26 are also partially embedded in the brush head 10. Two different types of cleaning elements 20, 26 are shown, but the brush head section 10 can also comprise further types of cleaning elements. At the surface of the brush head 10 where the cleaning elements 20, 26 do not protrude from an insert 12 partially embedded into the brush head 10. The insert 12 may be a coupling structure or a drive part which connects the brush head 10 to the electrically powered handle. In one embodiment, the insert 12 comprising the coupling structure at least partially supports the two-component cleaning element 20 and/or the bristle tuft 26, as is illustrated in FIG. 6. The insert 12 is partially embedded into the brush head 10, wherein undercuts are formed in order to produce a secure connection between the brush head 10 and the electrically powered handle. The insert 12 can be combined with every other 2K cleaning element 20 or bristle tuft 26.

Figure 7A:
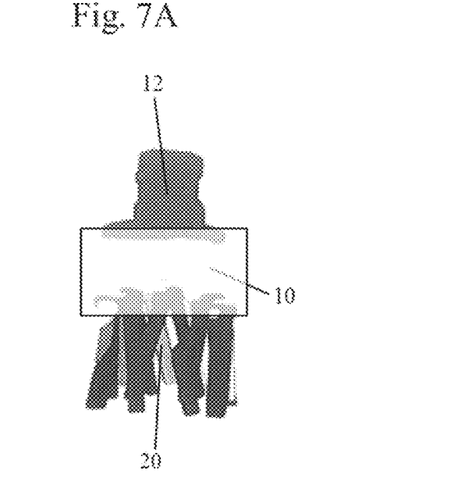
FIG. 7A shows a schematic representation of another part of a replacement toothbrush head to be connected to an electrically powered handle, wherein the brush head shown comprises one 2K cleaning element and several twisted bristle tufts.
Figure 7B:
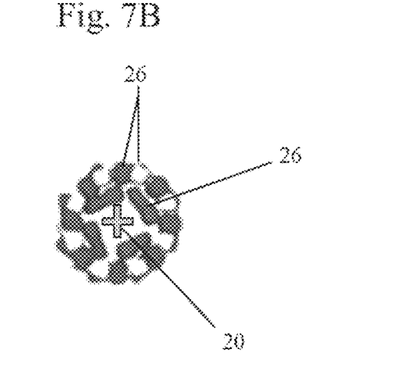
FIG. 7B shows a top view of the cleaning elements of the replacement toothbrush head shown in FIG. 7A.

FIGS. 7A and B show another toothbrush head 10, in particular a section thereof that is connectable with a gearing of and electrically powered toothbrush. Each of the features shown in FIG. 7 can be designed in reduced form or in a different combination than those represented. Features that are in common with FIGS. 1 to 6 are designated with the same reference numerals and are not described in detail again. FIG. 7A shows a longitudinal cross-sectional representation of a part of an example replacement brush head which is intended to be coupled to an electrically powered toothbrush handle via the insert 12. The toothbrush part shown comprises several types of cleaning elements comprising a 2K cleaning element 20 in combination with bristle tufts 26. The bristle tufts 26 are inclined and twisted with respect to the surface of the brush head 10. The bristle tuft cleaning elements 26 may show different tuft geometries, e.g. round, rectangular, elongated rectangular, half-circles or combinations thereof. The bristles in the bristle tufts 26 are made, for example, from polyamid and are anchored into the brush head 10 by over-molding including the formation of undercuts. The 2K cleaning element 20 comprises two different plastic materials and is prepared by injection molding.

FIG. 7B shows a top view of the cleaning element field shown in FIG. 7A. The bristle tufts 26 are arranged at the outer circle and the 2K cleaning element 20 is located in the middle of the bristle tufts 26. The first component 21 of the 2K cleaning element 20 may be a thermoplastic elastomer having a Shore A hardness in the range of about 40 to about 50. The second component 22 may be made form polypropylene. The second component 22 will be embedded together with the fused ends of the tufts 26 into the brush-head part 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What we claim is:

1. A method for producing a toothbrush head or a part thereof, the method comprising the steps of:
    providing at least a first mold half and a second mold half, the first mold half comprising blind cavities structured and configured to receive and support at least one two-component cleaning element and at least one bristle tuft therein;
    providing the at least one two-component cleaning element having a first end comprising a first component and a second end comprising a second component, wherein the second component comprises at least one undercut;
    inserting the at least one two-component cleaning element and the at least one bristle tuft into the blind cavities of the first mold half, wherein the first component of the two-component cleaning element and a first part of the at least one bristle tuft are covered by the first mold half and wherein the first end of the two-component cleaning element is supported by at least one of the blind cavities;
    providing a coupling insert comprising a metal or a metal alloy and structured and configured to connect the toothbrush head to a toothbrush handle, wherein a part of the coupling insert is located inside the mold cavity;
    forming a mold cavity by combining the at least first mold half with the at least second mold half, wherein the second component of the at least one two-component cleaning element, including the at least one undercut, and a second part of the at least one bristle tuft are located inside the mold cavity; and
    injecting plastic material into the mold cavity, wherein the second component of the at least one two-component cleaning element including the at least one undercut, the second part of the at least one bristle tuft, and the part of the coupling insert located inside the molding cavity are over-molded by the injected plastic material and wherein the brush head or the part thereof is formed thereby.

2. The method according to claim 1, wherein the at least one bristle tuft is inserted into the first mold half before or after the at least one two-component cleaning element.

3. The method according to claim 1, wherein the at least one bristle tuft comprises a plurality of individual filament fibers, wherein the plurality of filament fibers are fused to form a filament tuft located in the first mold half.

4. The method according to claim 1, wherein the step of providing the at least one two-component cleaning element comprises inserting the first component into the first mold half and over-molding the first component with the material of the second component to form the two-component cleaning element.

5. The method according to claim 1, wherein the first component and the second component of the at least one two-component cleaning element comprise two different hard plastic materials, two different soft plastic materials, or a hard plastic material and a soft plastic material.

6. The method according to claim 1, wherein the at least one two-component cleaning element further comprises at least one of a third component and a fourth component wherein at least some of the first, second, third, and fourth components of the at least one two-component cleaning element comprise a material different from a material of each of the other three components.

7. The method according to claim 1, wherein the at least one first mold half comprises several first mold segments provided in parallel to form several brush heads or parts thereof in parallel.

8. The method according to claim 1, wherein one of the first component and the second component of the two-component cleaning element comprises a hard plastic material and the other one of the first component and the second component of the two-component cleaning element comprises an elastomeric material.

9. The method according to claim 1, wherein at least one of the first component and the second component of the two-component cleaning element comprises a hard-plastic material.

10. The method according to claim 1, wherein at least one of the first component and the second component of the two-component cleaning element comprises an indicator element.

11. The method according to claim 1, wherein at least one of the first component and the second component of the two-component cleaning element comprises a bundle of super-thin tapered bristles.

12. The method of claim 1, wherein the coupling insert is provided to at least partially support at least one of the two-component cleaning element and the bristle tuft.

13. A method for producing a toothbrush head or a part thereof, the method comprising the steps of:

providing at least a first mold half and a second mold half, the first mold half comprising blind cavities structured and configured to receive and support at least one two-component cleaning element and at least one bristle tuft therein;

providing the at least one two-component cleaning element having a first end and a second end, wherein the first end includes a first component and the second end includes a second component comprising at least one undercut, wherein at least one of the first component and the second component comprises cellulose reservoirs filled with at least one oral-care chemical active to be released therefrom and delivered on contact with water, saliva, or due to mechanical influence by the bristle filaments during brushing;

inserting the at least one two-component cleaning element and the at least one bristle tuft into the blind cavities of the first mold half, wherein the first component of the two-component cleaning element and a first part of the at least one bristle tuft are covered by the first mold half and wherein the first end of the two-component cleaning element is supported by at least one of the blind cavities;

forming a mold cavity by combining the at least first mold half with the at least second mold half, wherein the second component of the at least one two-component cleaning element, including the at least one undercut, and a second part of the at least one bristle tuft are located inside the mold cavity; and injecting plastic material into the mold cavity, wherein the second component of the at least one two-component cleaning element including the at least one undercut, and the second part of the at least one bristle tuft are over-molded by the injected plastic material and wherein the brush head or the part thereof is formed thereby.

14. The method of claim 13, wherein the at least one oral-care chemical active is selected from the group consisting of an anti-sensitivity chemical, a pain-relief chemical, a wound-healing chemical, an anti-inflammation chemical, an anti-tartar chemical, a whitening chemical, an anti-bacterial chemical, and anti-erosion chemical, and any combination thereof.

* * * * *